United States Patent [19]
Ito et al.

[11] Patent Number: 6,152,217
[45] Date of Patent: *Nov. 28, 2000

[54] AIR TEMPERATURE CONTROL SYSTEM FOR A VEHICLE

[75] Inventors: Yuji Ito, Ichinomiya; Takayoshi Kawai, Hoi-gun, both of Japan

[73] Assignee: Denso Corporation, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/777,946

[22] Filed: Dec. 23, 1996

[30] Foreign Application Priority Data

Dec. 25, 1995 [JP] Japan ................................. 7-337143

[51] Int. Cl.$^7$ .................................................. B60H 1/00
[52] U.S. Cl. .......................... 165/202; 165/42; 237/2 A; 237/12.3 R; 237/12.3 B
[58] Field of Search ................................ 62/244; 165/42, 165/43, 203; 237/2 A, 12.3 R, 12.3 B

[56] References Cited

U.S. PATENT DOCUMENTS

| | | | |
|---|---|---|---|
| 4,311,188 | 1/1982 | Kojima et al. | |
| 4,495,560 | 1/1985 | Sugimoto | 364/154 |
| 4,991,405 | 2/1991 | Sakano | 62/244 |
| 5,156,204 | 10/1992 | Doi | 165/17 |
| 5,209,081 | 5/1993 | Matsuoka | 62/244 |
| 5,293,928 | 3/1994 | Iida | 165/16 |
| 5,309,731 | 5/1994 | Nonoyama | 62/244 |
| 5,803,166 | 9/1998 | Ito et al. | 165/203 |

FOREIGN PATENT DOCUMENTS

| | | |
|---|---|---|
| 1-282012 | 11/1989 | Japan . |
| 2-58126 | 12/1990 | Japan . |
| 4-257716 | 9/1992 | Japan . |
| 5-58147 | 3/1993 | Japan . |

*Primary Examiner*—Ira S. Lazarus
*Assistant Examiner*—Terrell McKinnon
*Attorney, Agent, or Firm*—Harness, Dickey & Pierce, PLC

[57] ABSTRACT

When target blowout temperature to the inside of a vehicle is over a predetermined temperature in, an air temperature control system according to the present invention controls a cooling-ability controller to control air temperature of air cooled by a heat exchanger for cooling so that airflow becomes a predetermined temperature, and reduces the amount of blowout air into the vehicle per unit time compared with the amount of the blowout air when the target blowout temperature is under the predetermined temperature. Accordingly, the cooling air temperature due to the heat exchanger for cooling is fixed at the predetermined temperature even when the target blowout temperature is over the predetermined temperature. Therefore, generation of malodors due to dust and mold in the heat exchanger for cooling is prevented.

20 Claims, 8 Drawing Sheets

AIR TEMPERATURE CONTROL SYSTEM FOR A VEHICLE

CROSS-REFERENCE TO RELATED APPLICATION

The present application is related to and claims priority from Japanese Patent Application No. Hei 7-337143, incorporated herein by reference.

BACKGROUND OF THE INVENTION

1. Field of the Invention

The present invention relates to an air temperature control system for a vehicle for controlling a cooling unit cooling the inside of the vehicle or a heating unit heating the inside of the vehicle.

2. Description of Related Art

An air temperature control system for a vehicle for controlling air conditioning or heating units in order to cool the vehicle's rear seat area by means of a rear cooling unit and to heat the rear seat area by means of a rear heating unit is disclosed in Japanese Patent Number B2 258126. More specifically, a required quantity of heat $Q^R$ is determined for maintaining the rear seat air temperature at a predetermined rear seat air temperature. When the required quantity of heat $Q^R$ is negative, the rear cooling unit starts cooling the rear seat air with the rear heating unit turned off. When the required quantity of heat $Q^R$ is positive, the rear heating unit starts heating with the rear cooling unit turned off.

When cooling the rear seat air, a required air quantity WRC to the rear seat is determined based on the deviation between the rear seat air temperature and the predetermined rear seat air temperature, and a target blowout temperature $TAO^4$ necessary for obtaining the above-mentioned required quantity of heat $Q^R$ under the required air quantity WRC is calculated. Accordingly, a coolant valve for controlling the coolant flow to a rear evaporator is turned on and off to obtain the target blowout temperature $TAO^R$ without frosting the rear evaporator.

In addition, when heating the rear seat area, the required air quantity WRH is determined based on a deviation between the rear seat air temperature and the determined rear seat air temperature, and the target blowout temperature $TAO^R$, necessary for obtaining the required quantity of heat $Q^R$ under the required air quantity WRH, is calculated. Accordingly, a water valve for controlling the flow of warm water to a rear heater core in the rear heating unit is turned on and off to obtain the target blowout temperature $TAO^R$.

However, in the aforementioned air conditioning unit, when the outside air temperature is in an intermediate region, between 10 and 20° C., for example, a problem occurs. That is, when cooling the rear seat, sometimes the target blowout temperature $TAO^R$ is over, e.g., 15° C. At this time, after wind airflow based on the temperature is generated by the rear evaporator, a foul smell is emitted due to the dust and mold in the rear evaporator and oxide caused by the corrosion of the rear evaporator, thereby giving passengers in the vehicle compartment an unpleasant feeling. Needless to say, this kind of problem also occurs when providing a cooling unit at the front seat area.

Further, when heating the rear seat, the target blowout temperature $TAO^R$ sometimes falls below the inlet temperature of the rear heating unit. However, since the rear heater core in the rear heating unit produces airflow at temperature in excess of the inlet temperature, the airflow at a temperature under the inlet temperature cannot be produced by the rear heating unit. This kind of problem also occurs when providing the heating unit at the front seat area.

SUMMARY OF THE INVENTION

The aforementioned problems of the prior art are solved according to a first aspect of the present invention by providing a system in which, when target blowout temperature to the inside of the vehicle is over a predetermined temperature, an air temperature control system includes a cooling ability controller for controlling air cooling temperature by a heat exchanger for cooling so that airflow becomes a predetermined temperature, and reduces the amount of blowout air into the vehicle per unit time compared with the amount of the blowout air when the target blowout temperature is under the predetermined temperature.

Accordingly, the cooling air temperature due to the heat exchanger for cooling is fixed at the predetermined temperature even when the target blowout temperature is over the predetermined temperature. Therefore, generation of malodors due to dust and mold in the heat exchanger for cooling is prevented.

Here, according to the above description, if the cooling air temperature is fixed at the predetermined temperature even though the target blowout temperature is over the predetermined temperature, the quantity of supply heat to the vehicle is superfluous in an aspect of temperature.

However, according to the present invention, the excess heat quantity can be set off and a desired quantity of heat can be supplied to the inside of the vehicle because the blowout air amount per unit hour is reduced compared to the blowout air amount when the target blowout temperature is under the predetermined temperature.

According to a second aspect of the present invention, when the target blowout temperature to the inside of the vehicle is under an air temperature at an inlet side of a heat exchanger for heating (hereinafter, inlet temperature), the blowout air amount to the vehicle per unit time is reduced compared to the blowout air amount when the target blowout temperature is over the inlet temperature.

Here, the heat exchanger for heating is for heating the inlet temperature. Since the heat exchanger cannot produce the air at the temperature under the inlet temperature, the air at the same temperature as the inlet temperature is blown into the vehicle when the target blowout temperature is under the inlet temperature. That is, the quantity of supply heat to the vehicle is superfluous in an aspect of temperature because the blowout temperature into the vehicle is fixed at the inlet temperature in spite of the fact that the target blowout temperature is under the inlet temperature.

However, according to the present invention, the excess heat quantity can be set off and a desired quantity of heat can be supplied to the inside of the vehicle because the blowout air amount per unit hour is reduced compared to the blowout air amount when the target blowout temperature is over the predetermined temperature.

According to a third aspect of the present invention, a blowout air amount per unit time to the vehicle is reduced by repeating the operation and stopping of the blower.

A type of blower which generates an air flow by driving a fan with a DC motor is generally used. In case of driving a fan using the DC motor, in terms of the characteristics of the motor, the fan cannot be in operation unless a drive voltage at least a predetermined voltage (4V, for example) is applied to the fan. That is, the minimum amount of air obtained by rotating the fan is the amount corresponding to this predetermined voltage. No air amount under this air amount can be obtained.

Therefore, for the above-mentioned reasons, the target blowout temperature can neither be over the predetermined temperature when the blower is in operation at the minimum air amount, nor the under absolute air amount when the target blowout temperature is under the inlet temperature so as to reduce the blowout air amount per unit time. On the other hand, since the present invention takes the process of repeating operation and stoppage of the blower, the blowout air amount per unit hour to the vehicle can be easily reduced even if the blower is in operation at the maximum air amount in the above-mentioned way.

According to a fourth aspect of the present invention, the cycle of the blower going between operation and stoppage is varied periodically. In this way, the periodic variation of the cycle provides passengers in the vehicle with a sense of air gusting, thereby withdrawing a sense of incompatibility the passengers may feel due to the repetition of blowing and stoppage.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1:
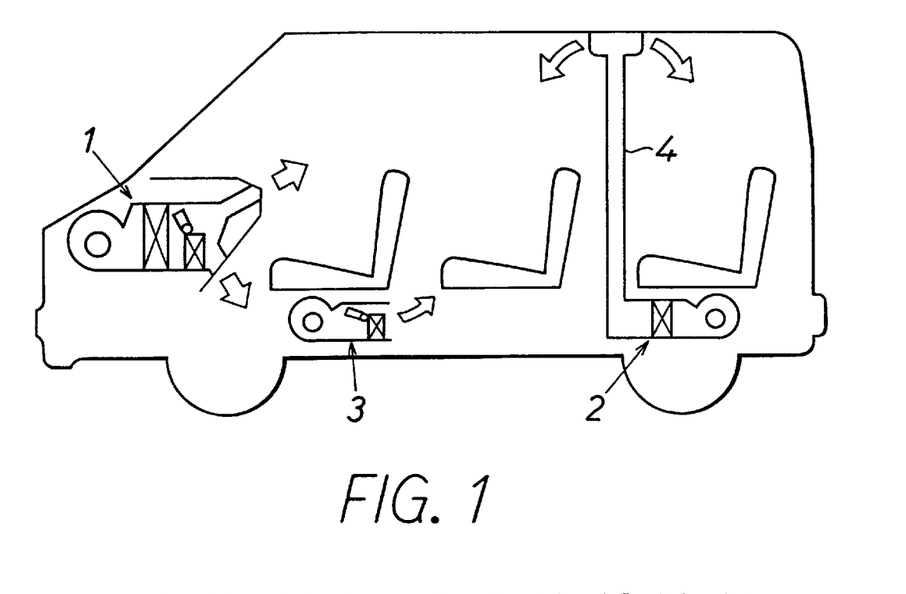
FIG. 1 is a schematic view illustrating a position of each heating/cooling unit in a vehicle according to a preferred embodiment of the present invention.

An embodiment of the present invention will hereinafter be described with respect to the accompanying drawings. As shown in FIG. 1, a front air temperature control unit 1 for cooling and heating a front seat area is disposed at the front seat side of a vehicle. A rear cooling unit 2 for cooling a rear seat area and a rear heater unit 3 for heating the rear seat area are disposed at the rear side thereof.

Front air conditioning unit 1 is provided at an inside of a vehicle instrument panel disposed at the vehicle front seat side. Air is blown from a position toward the upper part of the body and the feet of the passenger at the front seat and also toward an inner surface of a windshield.

Rear cooler unit 2 is provided at a space between a inner wall of the vehicle and the bottom of the rear seat so that air is blown primarily toward the head of a passenger in the rear seat from the vehicle ceiling via a ceiling duct 4.

Rear heater unit 3 is provided at a bottom portion of the front passenger seat. From this position, air is blown mainly to the foot of the passenger on the rear seat.

Figure 2A:
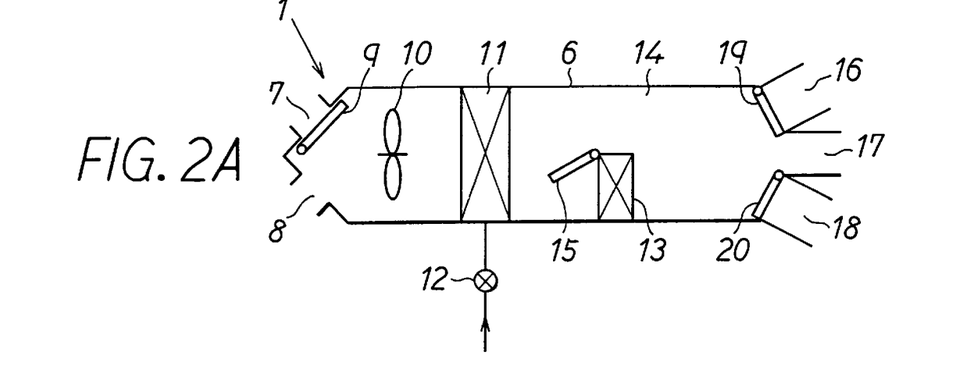
FIG. 2A is a schematic view of a front air temperature control unit.

Next, the structure of front air conditioning unit 1 will be described with reference to FIG. 2A. While an internal air inlet 7 for drawing in internal air in the vehicle and an external air inlet 8 for drawing in external air are provided at a portion at air upstream side of an air conditioning case, an internal/external air switching door 9 is also formed thereat for switching an inlet ratio of the internal air to the external air from inlets 7 and 8. This internal/external air switching door 9 is driven by a servomotor (see FIG. 3) as a driving means.

A fan 10 as a blower is disposed at an air downstream portion of the internal/external switching door 9. This fan is driven by a blower motor 49 (see FIG. 3) as means for driving fan 10 so that the rotational speed of fan 10, that is, the amount of blowing air, is controlled by the blower voltage applied to blower motor 49. Here, the blower voltage is determined by an ECU 5 (see FIG. 3).

A front evaporator 11 as a heat exchanger for cooling is disposed at an air downstream side of fan 10. Along with a compressor (not shown) driven by a vehicle engine (also not shown), rear evaporator 11 makes up a refrigeration cycle in conjunction with a condenser and decompressing means (not shown) or the like connected to each other with refrigerant pipes, as is known in the art. An electromagnetic valve 12 for controlling the refrigerant flow to the front evaporator 11 is provided at the refrigerant upstream side of front evaporator 11.

A front heater core 13 is disposed as a heat exchanger for heating at a portion of an air downstream side from front evaporator 11. Front heater core 13, having engine cooling water flow inside, reheats the air passing therethrough using the cooling water as a heat source. In addition, in air conditioning case 6, a bypass passage 14 is formed so that cool air from front evaporator 11 bypasses front heater core 13.

In air conditioning case 6, an air mixing door 15 is disposed as a temperature adjusting means and as an air amount ratio adjusting means for adjusting the ratio of the amount of cool air passing through front heater core 13 to the amount of cool air passing through bypass passage 14. The air mixing door 15 is driven by a servomotor 45 (see FIG. 3) as a means for driving air mixing door 15.

A defroster opening 16 for blowing out air toward the inner surface of the windshield, a front face opening 17 for blowing out air toward the upper portion of the passenger at the front seat, and a front foot opening 18 for blowing out air to the foot of the passenger at the front seat are formed at a portion of an air downstream side of air conditioning case 6.

Further, in air conditioning case 6, a defroster door 19 for opening and closing defroster opening 16 and a face/foot switching door 20 for selectively opening and closing front face opening 17 and front foot opening 18 are provided. These doors 19 and 20 are driven by servomotors 46 and 47 (see FIG. 3) as means for driving doors 19 and 20, respectively.

Figure 2B:
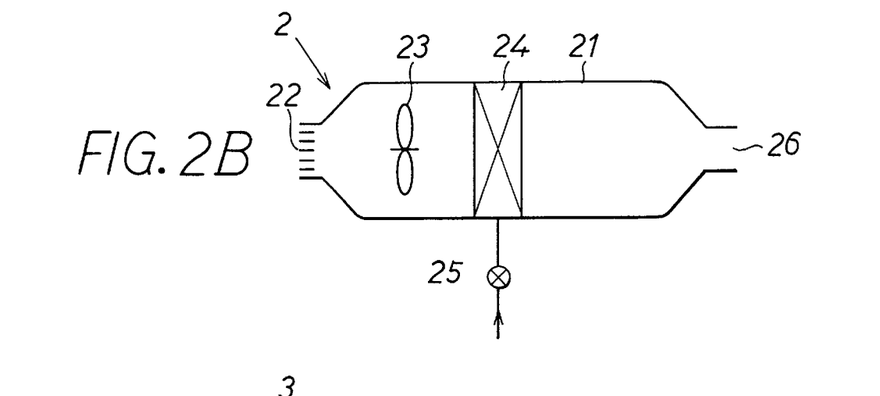
FIG. 2B is a schematic view of a rear cooler unit.

A structure of rear cooler unit 2 will now be described with reference to FIG. 2B. At an air upstream portion of a cooler case 21 as an air passage, an internal air inlet 22 is formed opening nearby the foot of the passenger at the rear seat. A fan 23 as a blower is disposed in the cooler case 21. This fan 23 is driven by a blower motor 50 (see FIG. 3) as means for driving fan 23, and the rotational speed of fan 23 is controlled by the blower voltage applied to blower motor 50. This blower voltage is determined by ECU 5 (see FIG. 3).

At a downstream side of fan 23, a rear evaporator 24 is disposed as a heat exchanger for cooling air. Rear evaporator 24 makes up part of the same refrigeration cycle as front evaporator 11 as mentioned above. An electromagnetic valve 25 for controlling the flow of refrigerant to rear evaporator 24 is provided at the refrigerant pipe at the refrigerant upstream side of rear evaporator 24. A rear face opening 26 to which ceiling duct 4 (see FIG. 1) is connected is formed at an air downstream portion of cooler case 21.

Figure 2C:
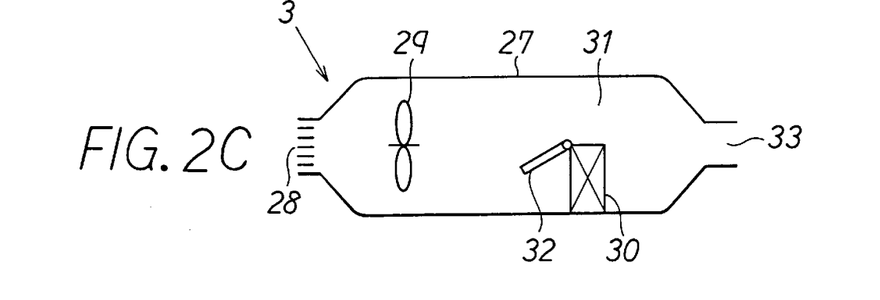
FIG. 2C is a schematic view of a rear heater unit according to the embodiment of the present invention.

Next, a structure of rear heater unit 3 will be described with reference to FIG. 2C. At an air upstream side of a heater case 27 as an air passage, an internal air inlet 28 is formed to open around the foot of the passenger at the front passengers seat. A fan 29 as blowing means is disposed in heater case 27. This fan 29 is driven by a blower motor 51 (see FIG. 3) as means for driving fan 29. The rotational speed of fan 29 is controlled by the blower voltage applied to blower motor 51. In addition, the blower voltage is determined by ECU 5 (see FIG. 3). A rear heater core 30 as a heat exchanger for heating is disposed at a downstream side of fan 29. Rear heater core 30, having engine cooling water flow inside thereof, is for heating the air passing through rear heater core 30 using the cooling water as a heat source. A bypass passage 31 is formed for bypassing the air from fan 29 through rear heater core 30.

In addition, in heater case 27, an air mixing door 32 is disposed as a temperature adjusting means and as an air amount ratio adjusting means for adjusting the ratio of the amount of the air passing through rear heater core 30 and the amount of the air passing though bypass passage 31. Air mixing door 32 is driven by a servomotor 48 (see FIG. 3) as means for driving air mixing door 32. Further, a rear foot opening is provided at the air downstream side portion of heater case 27. Rear foot opening 33 is connected to a rear foot duct (not shown) for blowing out the conditioned air toward the foot of the passenger at the rear passenger seat.

Figure 3:
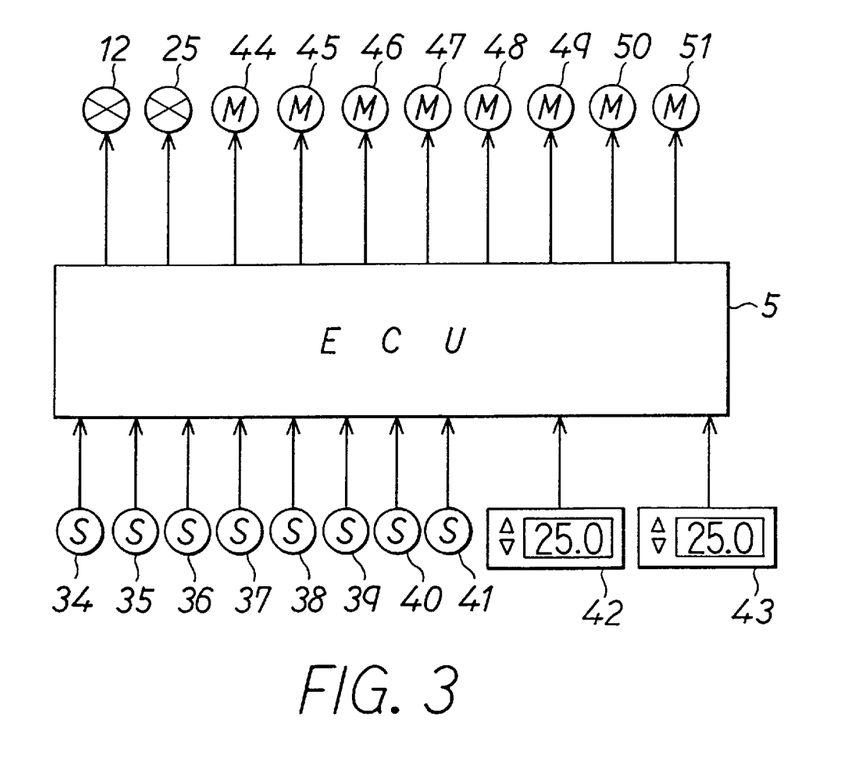
FIG. 3 is a block diagram of a control system according to the embodiment of the present invention.

Next, a structure of a controlling system of the present embodiment will be described with reference to FIG. 3. ECU 5 controlling each air temperature control unit in each of units 1 through 3 includes a well-known microprocessor and the like including a CPU, ROM, RAM, etc. and is driven with a power source from a battery (not shown) when a vehicle ignition switch (also not shown) is turned off.

Input terminals of ECU 5 are electrically connected to the following sensors: a front internal air temperature sensor 34 for detecting the temperature of the front seat area in the vehicle, a rear internal air temperature sensor 35 for detecting the temperature of the rear seat area in the vehicle, an external air temperature sensor 36 for detecting the external air temperature, an insolation sensor 37 for detecting an amount of sunlight irradiating the interior of the vehicle, a front evaporator temperature sensor 38 for detecting the temperature of air cooled by front evaporator 11 (more specifically, the air temperature after passing through front evaporator 11), a rear evaporator temperature sensor 39 for detecting the temperature by rear evaporator 24 (more specifically, the air temperature after the air passing through rear evaporator 24), a water temperature sensor 40 for detecting the temperature of engine coolant temperature, an inlet temperature sensor 41 as inlet air temperature detecting means for detecting the temperature of the air drawn in from internal air inlet 28 into heater case 27, a front temperature setting device 42 for setting a target temperature at the front seat side, and a rear temperature setting device 43 for setting a target temperature at the rear seat side.

Among these sensors, each signal from sensors 34 through 41 (front and rear internal temperature sensors 34 and 35, external temperature sensor 36, insolation sensor 37, front and rear evaporator temperature sensor 38 and 39, water temperature sensor 40, inlet temperature sensor 41) is A/D-converted by means of an A/D converter (not shown) in ECU 5 and input to the above-mentioned microprocessor.

On the other hand, front temperature setting device 42 is disposed on a front air conditioning panel provided in an instrument panel at the front seat. The front air conditioning panel further includes a switch for switching the blowoff mode, a switch for switching the internal/external air mode, a switch for adjusting blowoff air amount, an autoswitch for automatically controlling each of the air conditioning means in front air conditioning unit 1, or the like. Rear temperature setting device 43 is disposed on a rear air conditioning panel provided at the instrument panel at the rear seat. The rear air conditioning panel further includes a switch for switching the blowoff mode, a switch for adjusting blowoff air amount, an autoswitch for automatically controlling each of the air conditioning means in rear cooler unit 2 and rear heater unit 3, or the like.

Figure 4:
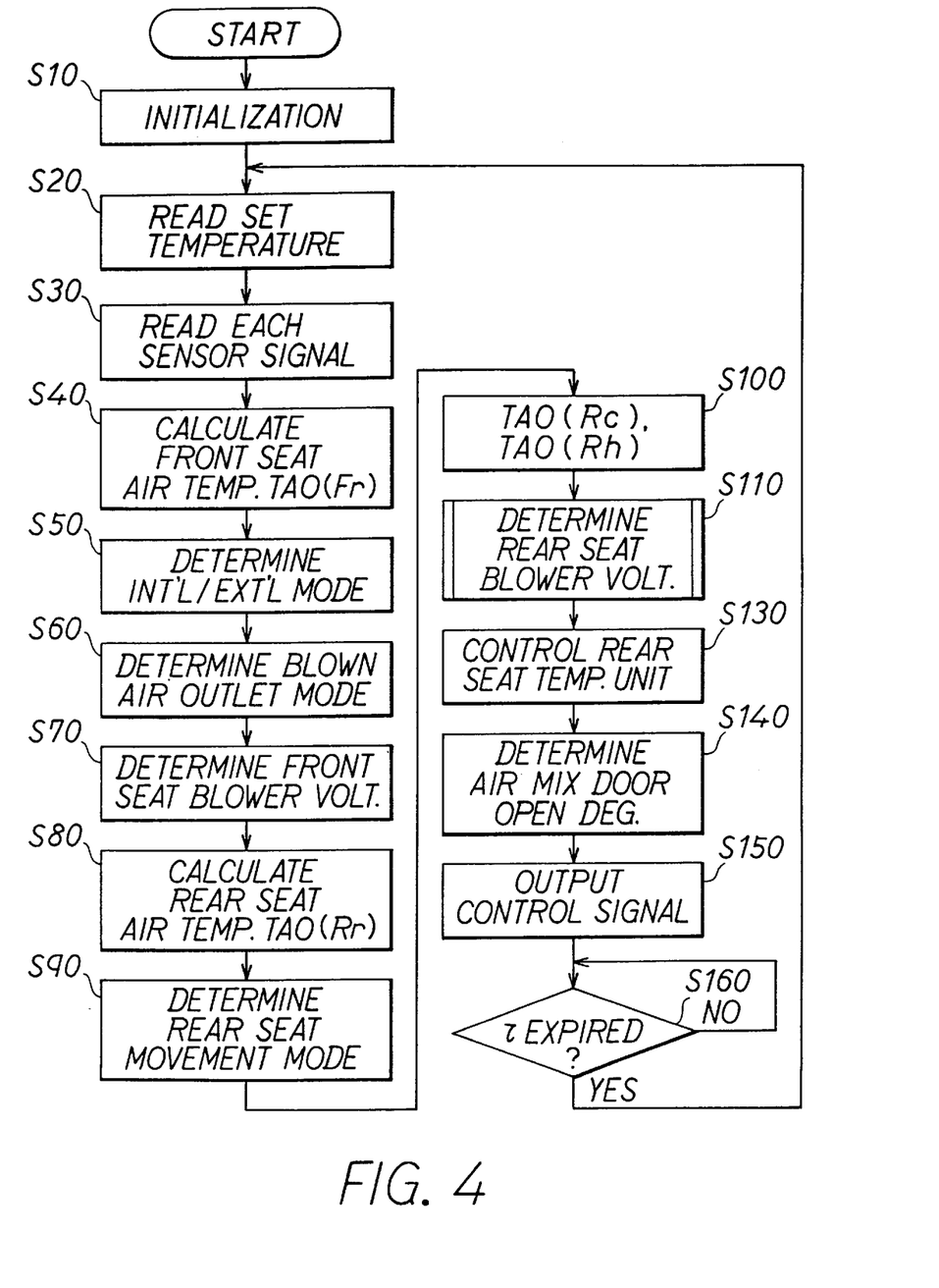
FIG. 4 is a flowchart of a microprocessor control program according to the embodiment of the present invention.

Next, a control process of the microprocessor will be described with reference to FIG. 4. When the ignition switch is turned on to supply power to ECU 5, routine of FIG. 4 is started, thereby performing an initializing process at Step S10 and reading the predetermined temperature (Tset (Fr), Tset (Rr)) set by temperature setting device 42 and 43 at Step S20. In the next Step S30, signals (Tr(Fr), Tr(Rr), Tam, Ts, Te(Fr), Te(Rr), Tw, Tin(Rr)), which are converted from the outputs of sensors 34 through 41 are retrieved.

In the next Step S40, a target blowout temperature at the front seat TAO(Fr) is computed based on the following Equation (1) stored in ROM beforehand.

$$TAO(Fr)=Kset(Fr)*Tset(Fr)-Kr(Fr)*Tr(Fr)-Kam(Fr)*Tam-Ks(Fr)*Ts+C(Fr)(°C.) \quad (1)$$

Here, the above-mentioned Kwet(Fr), Kr(Fr), Kam(Fr) and Ks(Fr) are correction gains, while C(Fr) is a correction coefficient.

Figure 5:
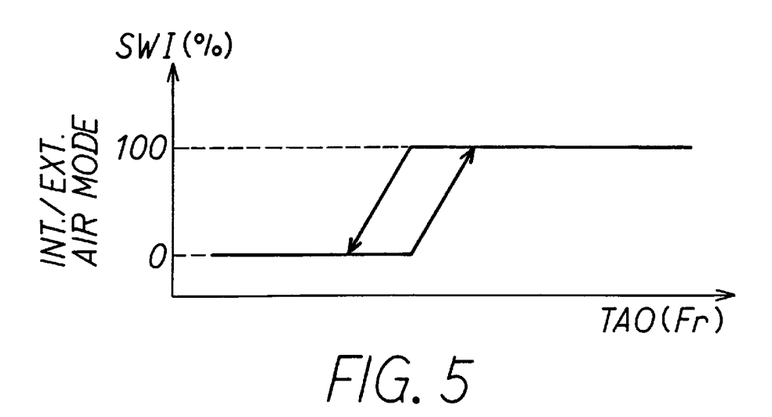
FIG. 5 is a graph of an internal/external air mode at a front seat side according to the embodiment of the present invention.

Next, in Step S50, an internal/external air mode of front air conditioning unit 1 is determined based on the aforementioned TAO(Fr) and a map of FIG. 5 which is stored in ROM. SWI in FIG. 5 is a target opening of internal/external switching door 9. A 100% opening of SWI switches to a complete external air introducing mode, while a 0% opening of SWI switches to a complete internal air introducing mode.

Figure 6:
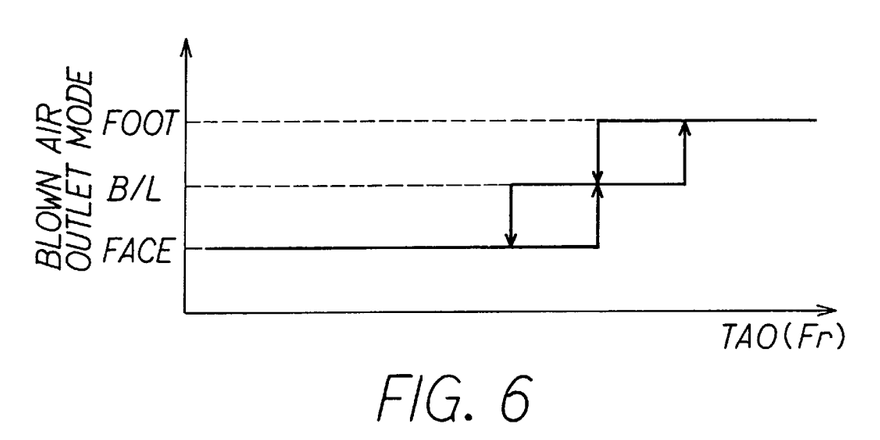
FIG. 6 is a graph of a blown air outlet mode at the front seat side according to the embodiment of the present invention.

In a Step S60, a blowout opening mode of front air conditioning unit 1 is determined based on the above-mentioned TAO(Fr) and a map of FIG. 6 which is stored in ROM beforehand.

At this point, a face mode (FACE) is a mode in which the air is blown out via front face opening 17 toward the upper portion of the front passenger's body. A bilevel mode (B/L) is a mode in which the air is blown off via front face opening 17 and front foot opening 18 toward both the upper portion and the foot of the front passenger's body. A foot mode (FOOT) is a mode in which the air is blown out via front foot opening 18 toward the foot of the front passenger's body.

Figure 7:
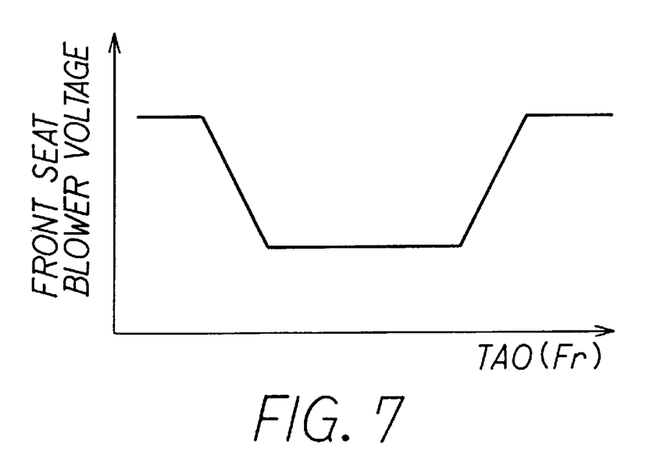
FIG. 7 is a graph of a front seat blower voltage according to the embodiment of the present invention.

Next, in a Step S70, the front blower voltage, which is applied to blower motor 49 of front air conditioning unit 1, is determined based on the above-mentioned TAO(Fr) and a map of FIG. 7 which is stored in ROM beforehand.

Then, in the next Step S80, rear target blowout temperature TAO(Rr) is computed based on the following Equation (2) which has already been stored in ROM.

$$TAO(Rr)=Kset(Rr)*Tset(Rr)-Kr(Rr)*Tr(Rr)-Kam(Rr)*Tam-Ks(Rr)*TS+C(Rr)-\approx*\alpha*((SWI+r)/(100+r))*(Tr(Fr)-Tr(Rr)) \text{ (°C.)} \quad (2)$$

The aforementioned Kset(Rr), Kr(Rr), Kam(Rr) and Ks(Rr) are correction gains, and C(Rr), $\beta$ and $\alpha$ are correction coefficients. Here, the correction coefficient $\beta$ is a coefficient indicating a degree of influence to the rear seat when front air conditioning unit 1 is in the external air introducing mode.

In addition, the last term of Equation (2), "$-\beta*\alpha*((SWI+r)/(100+r))*(Tr(Fr)-Tr(Rr))$", is for counteracting the influence of front air conditioning unit 1.

Figure 8:
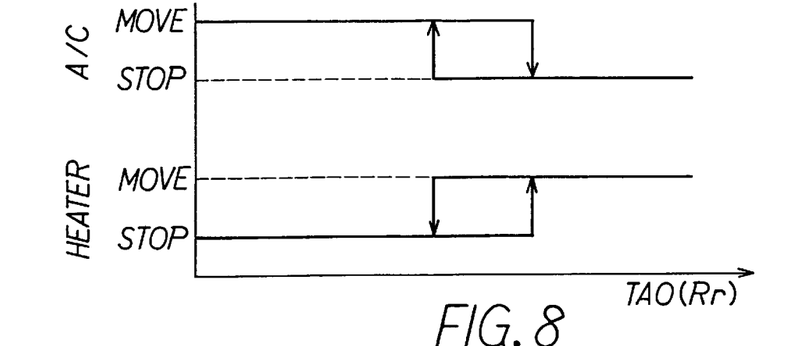
FIG. 8 is a map of operation modes of a rear cooler unit and a rear heater unit according to the embodiment of the present invention.

Next, in Step s90, operation modes of rear cooler unit 2 and rear heater unit 3 are determined based on the TAO(Rr) and a map of FIG. 8 which is stored in ROM beforehand. At this point, the mode in which only rear cooler unit 2 is operated corresponds to a face mode, while the mode in which only rear heater unit 3 is operated corresponds to a foot mode, and the mode in which both units 2 and 3 are operated corresponds to a bilevel mode. Hereinafter, above these operation modes are mentioned as FACE(Rr), FOOT(Rr) and B/L(Rr).

In the next Step S100, a target blowout temperature at rear cooler unit 2 TAO(Rc) and a target blowout temperature at rear heater unit 3 TAO(Rh) are computed.

More specifically, TAO(Rc) is computed based on the following Equation (3) stored in ROM in advance when the operation mode is in B/L(Rr) but is computed based on the following Equation (4) stored in ROM in advance when the operation mode is not in B/L(Rr). Further, TAO(Rh) is computed based on the following Equation (5) stored in ROM in advance when the operation mode is in B/L(Rr) but is computed based on the following Equation (6) stored in ROM in advance when the operation mode is not in B/L(Rr).

$$TAO(Rc)=TAO(Rr)-10 \text{ (°C.)} \quad (3)$$

$$TAO(Rc)=TAO(Rr) \text{ (°C.)} \quad (4)$$

$$TAO(Rh)=TAO(Rr)+10 \text{ (°C.)} \quad (5)$$

$$TAO(Rh)=TAO(Rr) \text{ (°C.)} \quad (6)$$

In this way, the difference is taken between TAO(Rc) and TAO(Rh) when the operation mode is in B/L(Rr) to generate the temperature difference between the top and bottom of the blowout air to the rear seat so that the passenger in the rear seat feels cooler at his head and warmer at his feet.

Figure 9:
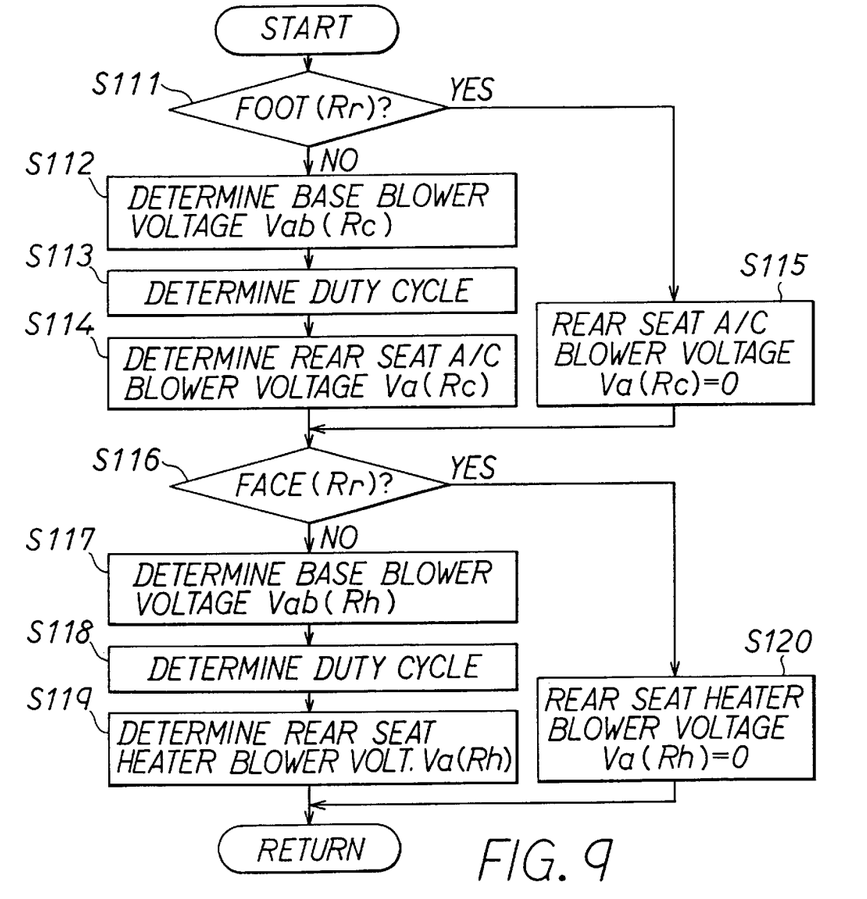
FIG. 9 is a flowchart showing Step S110 of FIG. 4 in greater detail.

Going on to the next Step S110, a sub-routine of FIG. 9 is called in order to determine rear cooler blower voltage Va(Rc) to be applied to blower motor 50 of rear cooler unit 2 and rear heater blower voltage Va(Rh) to be applied to blower motor 51 of rear heater unit 3. The following is the processing of FIG. 9.

In Step S111, the operation mode determined in Step S90 is determined whether the mode is FOOT(Rr) or not. Here, if the result is YES, since it is time to stop rear cooler unit 2, processing jumps to Step S115 so that rear cooler blower voltage Va(Rc) is set to zero.

Figure 10:
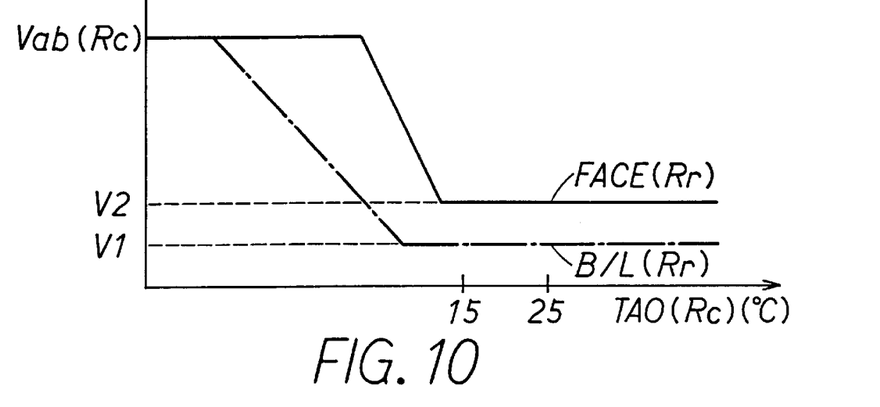
FIG. 10 is a graph of base blower voltage Vab(Rc) of the rear cooler unit according to the embodiment of the present invention.

On the other hand, when the result is NO in Step S111, since it is time to start rear cooler unit 2, in Step S112, blower voltage Vab(Rc) as a base of blower motor 50 is determined based on a map of FIG. 10 stored in ROM beforehand. In addition, according to the map of FIG. 10, when TAO(Rr) is 15° C. or more, the above-mentioned base blower voltage Vab(Rc) is set to be the minimum voltage (V1 or V2).

Here, base blower voltage Vab(Rc) in the operation mode of B/L(Rr) is smaller than base blower voltage Vab(Rc) in the mode of FACE(Rr) because air is blown out also from rear heater unit 3 when the B/L(Rr) mode is selected. That is, when the time of B/L(Rr), blower motor 51 of rear heater unit 3 is driven by the blower voltage corresponding to the difference between Vab(Rc) in FACE(Rr) and Vab(Rc) in B/L according to FIG. 10.

Figure 11:
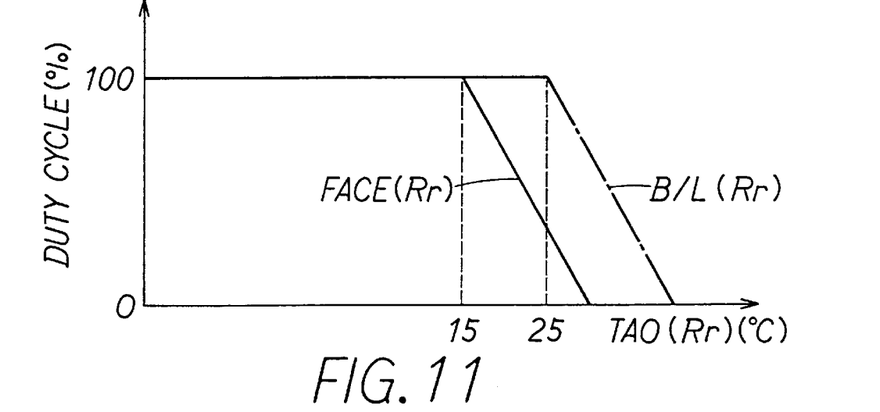
FIG. 11 is a graph of a duty cycle of the blower voltage of the rear cooler unit according to the embodiment of the present invention.
Figure 12:
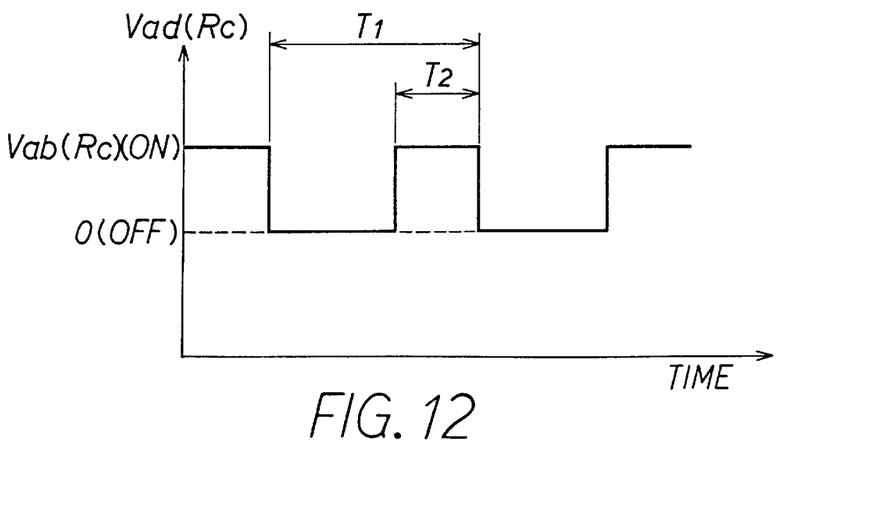
FIG. 12 is a graph of blower voltage of the rear cooler unit according to the embodiment of the present invention.

Then, in the next Step S113, a duty ratio for turning on and off blower motor 50 is determined based on a map of FIG. 11 already stored in ROM. This duty ratio is, as illustrated in FIG. 12, a time T2 for turning on blower motor 50 with respect to a cycle T1 (2 minutes in the present embodiment) for turning on and off blower motor 50.

According to a map of FIG. 11, in the FACE (Rr) operation mode, the duty ratio becomes 100% if TAO(Rr) is 15° C. or less. If TAO(Rr) is greater than 15° C., the duty ratio is set to be smaller as TAO(Rr) becomes greater. When the operation mode is B/L(Rr), the duty ratio becomes 100% if TAO(Rr) is 25° C. or less, and the duty ratio becomes smaller as TAO(Rr) becomes greater if TAO(Rr) is 25° C.

In the next Step S114, the final rear cooler blower voltage Va(Rc) is determined. Here, the smaller of base blower voltage Vab(Rc) determined from FIG. 10 and blower voltage Vad(Rc) illustrated in FIG. 12 is determined to be the rear cooler blower voltage Va(Rc).

Then, Step S116 determines whether the operation mode determined in Step S90 is FACE(Rr) or not. Here, if the result is YES, since it is time to stop rear heater unit 3, the processing jumps Step S120 in order to set rear heater blower voltage Va(Rh) to zero. On the other hand, if the result is NO, since it is time to operate rear heater unit 3, blower voltage Vab(Rh) to be a base of blower motor 51 is determined based on a map of FIG. 13 already stored in ROM.

Figure 13:
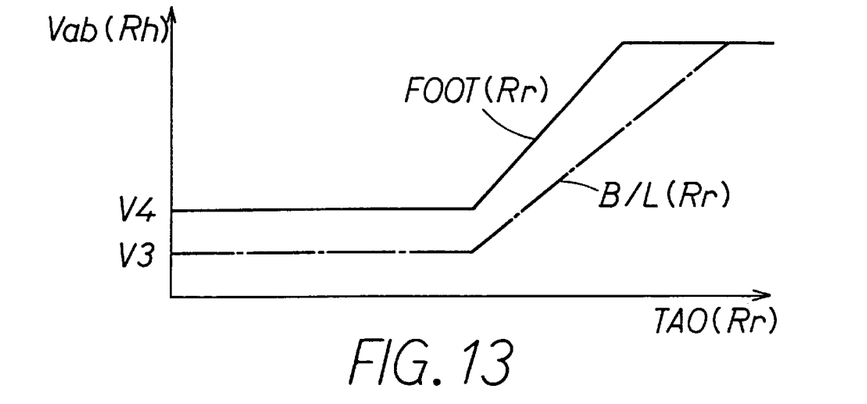
FIG. 13 is a graph of base blower voltage Vab(Rh) of the rear heater unit according the embodiment of the present invention.

The reason why base blower voltage Vab(Rh) when the operation mode is B/L(Rr) is smaller than base blower voltage Vab(Rh) of FOOT(Rr) mode is as mentioned above.

Figure 14:
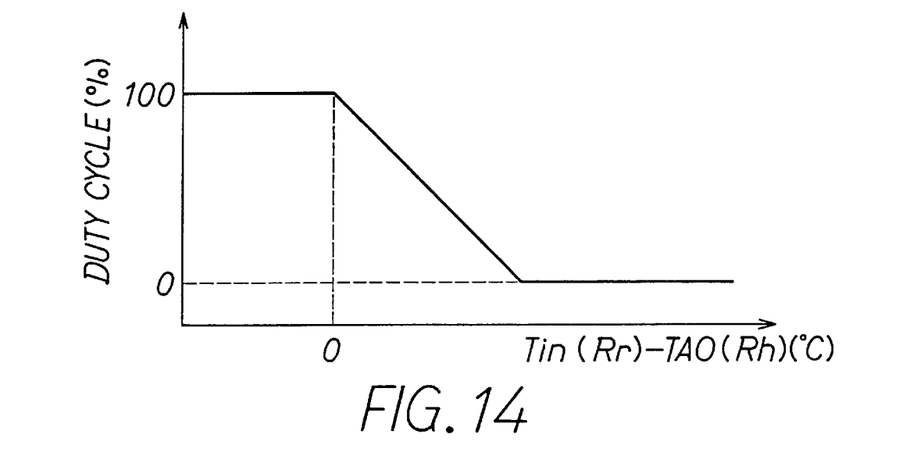
FIG. 14 is a graph of a duty cycle of the blower voltage of the rear heater unit according to the embodiment of the present invention.
Figure 15:
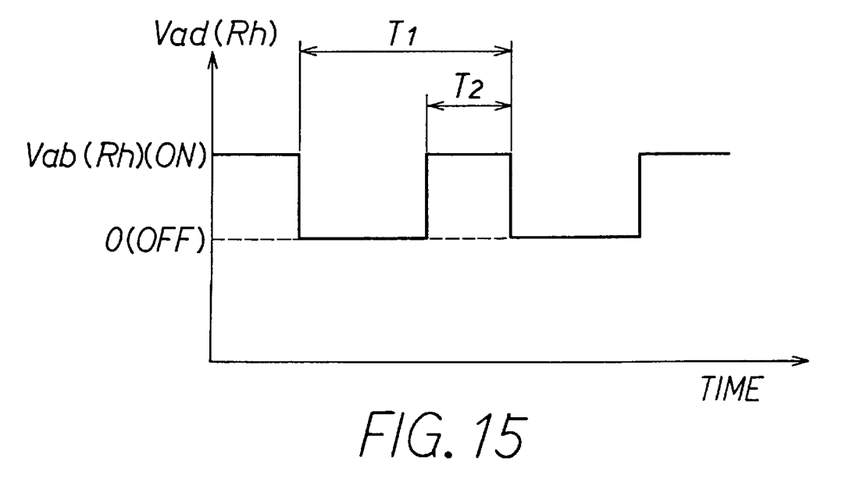
FIG. 15 is a graph of the blower voltage of the rear heater unit according to the present invention.

Next, in Step S118, a duty ratio for turning on and off blower motor 51 is determined based on a map of FIG. 14 already stored in ROM. This duty ratio is, as shown in FIG. 15, a time T2 for turning blower motor 51 on with respect to a cycle T1 (2 minutes for the present embodiment) for turning blower motor 51 on and off.

According to the map of FIG. 14, the duty ratio is set to be 100% when a deviation between inlet temperature Tin (Rr) and target blowout temperature TAO(Rh) is 0° C. or less (that is, Tin(Rh)≦TAO(Rh)). When the deviation is 0° C. or more, i.e., Tin(Rr)≧TAO(Rh), the duty ratio is set to be smaller as the deviation becomes greater.

In the next Step S119, the final rear heater blower voltage Va(Rh) is determined. Here, the smaller of base blower voltage Vab(Rh) obtained from FIG. 13 and blower voltage Vad(Rh) illustrated in FIG. 15 is determined as rear heater blower voltage Va(Rh).

Then, in Step S130 according to FIG. 13, the blowout temperature from rear cooler unit 2 is controlled. More specifically, a target evaporator temperature TEO(Rr) is first determined based on TAO(Rc) computed from aforementioned Equations (3) and (4) and a map of FIG. 16 already stored in ROM. Secondly, an electromagnetic valve 25 (shown in FIG. 2B) is on-off controlled so that a rear seat evaporator temperature Te(Rr) detected by rear seat evaporator temperature sensor 39 becomes the above-mentioned target temperature TEO(Rr). This type of on-off control is generally known in the art.

Figure 16:
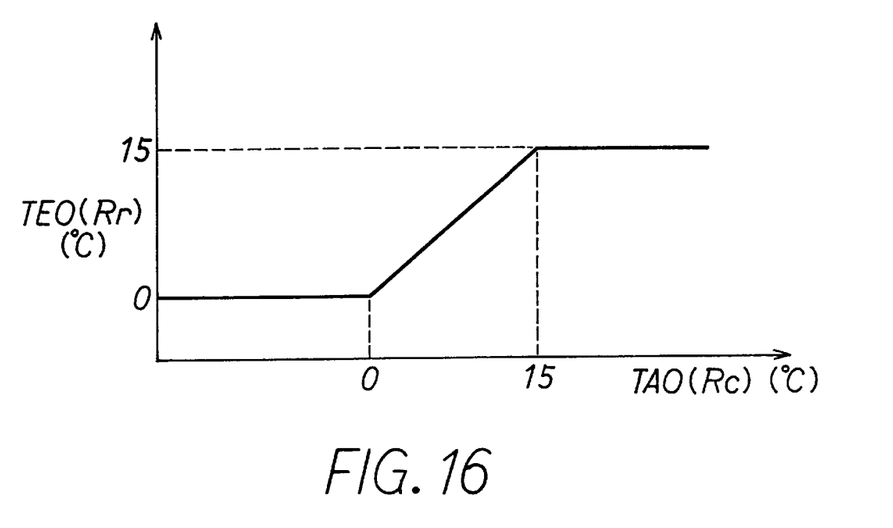
FIG. 16 is a graph of a target evaporator temperature TEO(Rr) of the rear cooler unit according to the embodiment of the present invention.

According to the map of FIG. 16, when TAO(Rc) is 0(°C.) or less, TEO(Rr) equals 0(°C.) and is maintained to be 0(°C.). This is because of a prevention of frost from rear evaporator 24. Further, when 0≦TAO(Rc)≦15(°C.), TEO(Rr)=TAO(Rc). When TAO(Rc)≧15(°C.), TEO(Rc)=15 (°C.) and is maintained the same. This is because there is the possibility of a foul smell being emitted from evaporator 24 when producing air of 15(°C.) or more at rear seat evaporator 24.

Then, in the next Step S140, each target opening θ(Fr) and θ(Rr) of air mixing door 15 and 32 are determined based on the following respective Equations (7) and (8) already stored in ROM.

$$\theta(Fr)=100*(TAO(Fr)--Te(Fr))/(Tw-Te(Fr))\ (\%) \quad (7)$$

$$\theta(Rr)=100*(TAO(Rh)-Tin(Rr))/(Tw-Tin(Rr))\ (\%) \quad (8)$$

In the next Step S150, control signals are output to each actuator in order to obtain each mode determined by the above-mentioned steps from S50 to S70 and from S110 to S140.

Step S160 determines whether the fixed control cycle time τ has expired or not. If YES, the processing goes back to Step S20, and if NO, the processing waits for the expiration of control cycle time τ.

As the aforementioned control is repeated, when rear seat cooler unit 2 is in operation, the air cooling temperature by means of rear seat evaporator 24 is maintained to be 15(°C.) even though TAO(Rc)≧15° C. Therefore, occurrence of a foul smell due to the dust or mold in rear seat evaporator 24 can be prevented.

At this point, if the air cooling temperature is maintained to 15° C. even if TAO(Rc)≧15° C. in the above-mentioned way, the supplied amount of heat to the vehicle compartment becomes excessive considering the aspect of temperature. However, according to the present embodiment, because the amount of blowout air to the vehicle compartment per unit time is reduced by turning on and off the air amount, the excessive amount of heat can be set off, thereby supplying the desired amount of heat to the vehicle compartment.

In addition, while rear heater unit 3 is in operation, if Tin(Rr) is Tin(Rr)≧TAO(Rh), because the target opening θ(Rr) of air mixing door 32 becomes θ(Rr)≦0 according to Equation (8), the blowoff temperature to the vehicle compartment is maintained to Tin(Rr), and the supplied amount of heat to the vehicle compartment becomes excessive considering the aspect of temperature. However, in this case, according to the present embodiment, because the blowout air amount to the vehicle compartment per unit time is reduced by turning on and off the air amount, the excessive heat amount is reduced, thereby supplying the desired amount of heat to the vehicle compartment.

Therefore, according to the present embodiment, with rear cooler unit 2 and rear heater unit 3, the rear seat can be controlled to a desired temperature by producing the necessary amount of heat without using a unit having both an evaporator and a heater core like front seat air conditioning unit 1.

Further, according to the present embodiment, since the blowout air amount to the vehicle compartment per unit hour is reduced by turning fans 23 and 29 on and off, the blowout air amount per unit hour can be easily reduced even if the blower voltage is the minimum voltage (V1 or V2 in FIG. 10, V3 or V4 in FIG. 13).

Although the present invention has been fully described in connection with the preferred embodiment thereof with reference to the accompanying drawings, it is to be noted that various changes and modifications will become apparent to those skilled in the art.

While cycle T1 in FIG. 12 or 15 is fixed in the above-mentioned embodiment, cycle T1 may be varied in conformity with a predetermined rule such as 1/f random, M-series random, or the like. Consequently, the variation of cycle T1 results in providing passengers in the rear seat with intermittent air gusts, thereby reducing a sense of incompatibility which the passenger may feel due to the changes in air amount.

Although the above embodiment describes an example of disposing front seat air conditioning unit 1 having front seat evaporator 11 and front seat heater core 14 at the front seat side, a cooler unit and a heater unit may be disposed for cooling and heating the front seat respectively, instead of front seat air conditioning unit 1. In addition, it is not necessary to provide both the cooler unit and the heater unit, and the present invention is applicable when either one of these is provided.

As a method of repeatedly changing the volume (power/strength) of the blowout air to the vehicle compartment, a method of repetitively turning fans 23 and 29 on and off is employing in the above embodiment. With repeating the strength and weakness of the air amount, or with gradually increasing and reducing the air amount, it is not necessary to turn the fan off.

While a method of repeatedly changing the strength of the blowout air to the vehicle compartment is employed as a method of reducing the amount of the blowout air to the vehicle compartment per unit time in the above embodiment, the amount of the blowout air may be reduced by reducing the absolute air amount itself.

In addition, the predetermined temperature according to the first aspect of the present invention is set to 15° C. in the above embodiment. Since passengers will not detect a foul smell from rear seat evaporator when the cooling air temperature by rear seat evaporator 24 is set under the predetermined temperature, the predetermined temperature may be selected to be near that temperature.

Further, the air cooling ability in rear seat evaporator 24 is adjusted by turning on and off electromagnetic valve 25 in the first embodiment, but the air cooling ability may be adjusted by turning on and off the compressor.

Still further, the first embodiment employs an air mixing type rear seat heater unit 3 for adjusting the blowout air temperature by controlling the opening of air mixing door 32, but the present invention may use the heater unit of a reheat type for adjusting the blowout air temperature by adjusting the flow amount or temperature of the hot water flowing into rear heater core 30.

Such changes and modifications are to be understood as being included within the scope of the present invention as defined by the appended claims.

What is claimed is:

1. An air temperature control system for a vehicle, comprising:
   a blower for generating an air flow;
   an air passage for receiving air generated by said blower into a passenger compartment of said vehicle;
   a cooling heat exchanger, disposed inside said air passage, for cooling air in said air passage; and
   cooling ability adjusting means for adjusting an air cooling ability of said cooling heat exchanger so that air cooling temperature cooled by said cooling heat exchanger becomes a target blowout temperature to said vehicle compartment;
   wherein when said target blowout temperature is higher than a predetermined temperature, said cooling ability adjusting means is controlled so that said air cooling temperature cooled by said cooling heat exchanger reaches said predetermined temperature, said cooling ability adjusting means also controlling said blower so that a blowout air amount per unit time to said vehicle compartment is reduced in accordance with a rise in the target blowout temperature, said cooling ability adjusting means controlling a temperature of said passenger compartment by regulating a temperature of said cooling heat exchanger when said target blowout temperature is above said predetermined temperature, said cooling ability adjusting means controlling said temperature said passenger compartment by regulating said blowout air amount per unit time from said blower when said target blowout temperature is below said predetermined temperature.

2. The system of claim 1, wherein said amount of blowout air per unit time is reduced by repeatingly varying a strength of blowout air to said vehicle passenger compartment.

3. The system of claim 2, wherein said strength of blowout air to said vehicle passenger compartment is repeatedly varied by repeating starting and stopping of said blower.

4. The system of claim 3, wherein a cycle of repeating said starting and stopping is periodically varied.

5. The system of claim 2, wherein:
   said cooling ability adjusting means correspondingly decreases said amount of blowout air when said target blowout temperature increases above said predetermined temperature;
   said cooling ability adjusting means maintains said cooling heat exchanger at said predetermined temperature when said target blowout temperature is above said predetermined temperature; and
   said cooling ability adjusting means maintaining said amount of blowout air at a substantially constant blow rate when said target blowout temperature is below said predetermined temperature.

6. An air temperature control system for a vehicle, comprising:
   a blower for generating an air flow;
   an air passage for receiving air generated by said blower;
   a heating heat exchanger, disposed in said air passage, for heating air in said air passage;
   temperature controlling means for controlling a temperature of blowout air to a vehicle passenger compartment; and
   inlet air temperature detecting means for detecting a temperature of air at an inlet side of said heating heat exchanger;
   wherein said temperature controlling means is further for controlling said temperature of blowout air to be a target blowout temperature to said vehicle passenger compartment; and
   when said target blowout temperature is less than an inlet temperature detected by said inlet temperature detecting means, said temperature controlling means also controlling said blower so that an amount of blowout air to said vehicle compartment per unit time is reduced in accordance with a drop of the target blowout temperature.

7. The system of claim 6, wherein said air passage includes a bypass passage therein for bypassing said heating heat exchanger, and said temperature controlling means includes an air amount ratio controlling means for controlling a ratio of an amount of air passing through said heating heat exchanger to an amount of air passing through said bypass passage.

8. The system of claim 7, wherein said amount of blowout air per unit time is reduced by repeatedly varying a strength of blowout air to said vehicle passenger compartment.

9. The system of claim 8, wherein said strength of blowout air to said vehicle passenger compartment is repeatedly varied by repeating starting and stopping of said blower.

10. The system of claim 9, wherein a cycle of repeating said starting and stopping is periodically varied.

11. The system of claim 6, wherein said amount of blowout air per unit time is reduced by repeatedly varying a strength of blowout air to said vehicle passenger compartment.

12. The system of claim 11, wherein said strength of blowout air to said vehicle passenger compartment is repeatedly varied by repeating starting and stopping of said blower.

13. The system of claim 12, wherein a cycle of repeating said starting and stopping is periodically varied.

14. A controller for a vehicle air conditioner apparatus that controls a heat exchanger so that a blowout air temperature reaches a target temperature when the target temperature is set within a predetermined heat exchanger limit, the controller controlling both the heat exchanger and a blowout air amount per unit time when the target temperature is set outside the predetermined heat exchanger limit so that the target temperature is reached while maintaining the predetermined heat exchanger limit, the controller reducing the blowout air amount per unit time In accordance with an offset amount of the target temperature from the predetermined heat exchanger limit.

15. The controller of claim 14, wherein the predetermined heat exchanger limit comprises a maximum blowout air cooling mode temperature.

16. The controller of claim 14, wherein the predetermined heat exchanger limit comprises a minimum blowout air heating mode temperature.

17. The controller of claim 14, wherein the blowout air amount is controlled based on stored map data when the target blowout temperature is set outside the predetermined heat exchanger limit.

18. A vehicle air conditioner comprising:

an air conditioner circuit including a cooler unit, a heater unit, a target blowout temperature calculator, a unit movement mode determining device, a cooler unit controller, and a heater unit controller;

the cooler unit including a first blowout device for generating a first air flow, a first air passage for introducing air from the blowout device to a vehicle compartment, a cooling heat exchanger disposed inside of the air passage for cooling the air within the first air passage, and a cooling ability adjusting device for controlling an air cooling ability of the cooling heat exchanger, the cooling ability adjusting device being controlled so that a temperature of the air cooled by the cooling heat exchanger reaches a vehicle compartment target blowout temperature;

the heater unit including a second blowout device for generating a second air flow, a second air passage for introducing air from the second blowout device to the vehicle compartment, a heating heat exchanger disposed inside of the second air passage for heating the air within the second air passage, a heating ability adjusting device for controlling an air heating ability of the heating heat exchanger, and an intake air temperature detector for detecting an intake side air temperature of the heating heat exchanger, the heating ability adjusting device being controlled so that a temperature of the air heated by the heating heat exchanger reaches the vehicle compartment target blowout temperature;

the target blowout temperature calculator being operative to calculate the target blowout temperature;

the unit movement mode determination device for determining whether the cooler unit of the heater unit should be driven based on the target blowout temperature calculated by the target blowout temperature calculator;

when the unit movement mode determining device determines that the cooler unit should be driven, the cooler unit controller controlling the cooling ability adjusting device so that the temperature of the air cooled by the cooling heat exchanger reaches the target blowout temperature when the target blowout temperature is less than a predetermined temperature, the cooler unit controller controlling the cooling ability adjusting device so that the temperature of the air cooled by the cooling heat exchanger is maintained at the predetermined temperature when the target blowout temperature is more than the predetermined temperature, and the cooler unit controller controlling the blowout device so that a vehicle compartment blowout amount air amount per unit time is reduced in accordance with a rise of the target blowout temperature; and when the unit movement mode determining device determines the heater unit should be driven, the heater unit controller controls the heating ability adjusting device so that the temperature of the air heated by the heating heat exchanger reaches the target blowout temperature when the target blowout temperature is more than an inlet temperature detected by an intake air temperature sensor, and controls the blowout device so that a blowout amount of air per unit time is reduced in accordance with a drop in the target blowout temperature when the target blowout temperature is less than the inlet temperature detected by the intake air temperature with a drop in the target blowout.

19. The vehicle air conditioner of claim 18, wherein the unit mode movement determination device selectively determines an operation mode as one of a first mode in which the only cooler unit is driven. a second mode in which only the heater unit is driven, and a third mode in which the cooler unit and the heater unit are driven.

20. The vehicle air conditioner of claim 19, wherein the blowout air amount of the cooler unit in the third mode is less than that of the first mode, and the blowout air amount of the heater unit in the third mode is less than that of the second mode.

* * * * *